United States Patent [19]
Watanabe et al.

[11] Patent Number: 5,961,232
[45] Date of Patent: Oct. 5, 1999

[54] CHARACTER INFORMATION PROCESSOR SWITCHABLE BETWEEN ORDINARY AND DEMONSTRATION STATES

[75] Inventors: Kenji Watanabe; Tomoyuki Shimmura; Takanobu Kameda; Chieko Aida, all of Tokyo; Hiroyasu Kurashina; Takeshi Hosokawa, both of Suwa, all of Japan

[73] Assignees: King Jim Co., Ltd.; Seiko Epson Corporation, both of Japan

[21] Appl. No.: 08/980,759

[22] Filed: Dec. 1, 1997

[30] Foreign Application Priority Data

Dec. 6, 1996 [JP] Japan .................................. 8-327096

[51] Int. Cl.⁶ ...................................................... B41J 11/26
[52] U.S. Cl. ........................... 400/615.2; 400/76; 400/70; 400/61
[58] Field of Search ............................. 400/61–76, 615.2, 400/70

[56] References Cited

U.S. PATENT DOCUMENTS

| | | | |
|---|---|---|---|
| 4,686,649 | 8/1987 | Rush et al. | 364/900 |
| 4,875,174 | 10/1989 | Olodort et al. | 364/519 |
| 4,891,769 | 1/1990 | Tasaki | 364/519 |
| 5,218,353 | 6/1993 | Okumara et al. | 340/815.01 |
| 5,567,062 | 10/1996 | Tanaka et al. | 400/62 |
| 5,748,190 | 5/1998 | Kjorsvik | 345/329 |
| 5,781,894 | 7/1998 | Petrecca et al. | 705/14 |

FOREIGN PATENT DOCUMENTS

| | | |
|---|---|---|
| 62-26571 | 2/1987 | Japan . |
| 62-62355 | 4/1987 | Japan . |
| 62-184874 | 8/1987 | Japan . |
| 62-220989 | 9/1987 | Japan . |
| 63-102954 | 5/1988 | Japan . |
| 63-144392 | 6/1988 | Japan . |
| 2308317 | 12/1990 | Japan . |
| 310874 | 1/1991 | Japan . |
| 3262675 | 11/1991 | Japan . |
| 3264384 | 11/1991 | Japan . |
| 437574 | 2/1992 | Japan . |
| 4286025 | 10/1992 | Japan . |
| 4312877 | 11/1992 | Japan . |
| 6155866 | 6/1994 | Japan . |
| 6165874 | 6/1994 | Japan . |
| 7239661 | 9/1995 | Japan . |
| 811387 | 1/1996 | Japan . |
| 8183212 | 7/1996 | Japan . |
| 8282068 | 10/1996 | Japan . |

Primary Examiner—Edgar Burr
Assistant Examiner—Charles H. Nolan, Jr.
Attorney, Agent, or Firm—Lorusso & Loud

[57] ABSTRACT

The present invention relates to a character information processor which can operate either in an ordinary state in which ordinary operations are performed or in a demonstration state in which demonstrating operations, including demonstration display and demonstration printing, are performed. The character information processor according to the present invention includes: a first operation state switch for switching the ordinary state to the demonstration state when receiving operation signals of a first number during the ordinary state; and a second operation state swtich for switching the demonstration state to the ordinary state when receiving operation signals of a second number during the demonstration state, the second number being smaller than the first number.

8 Claims, 4 Drawing Sheets

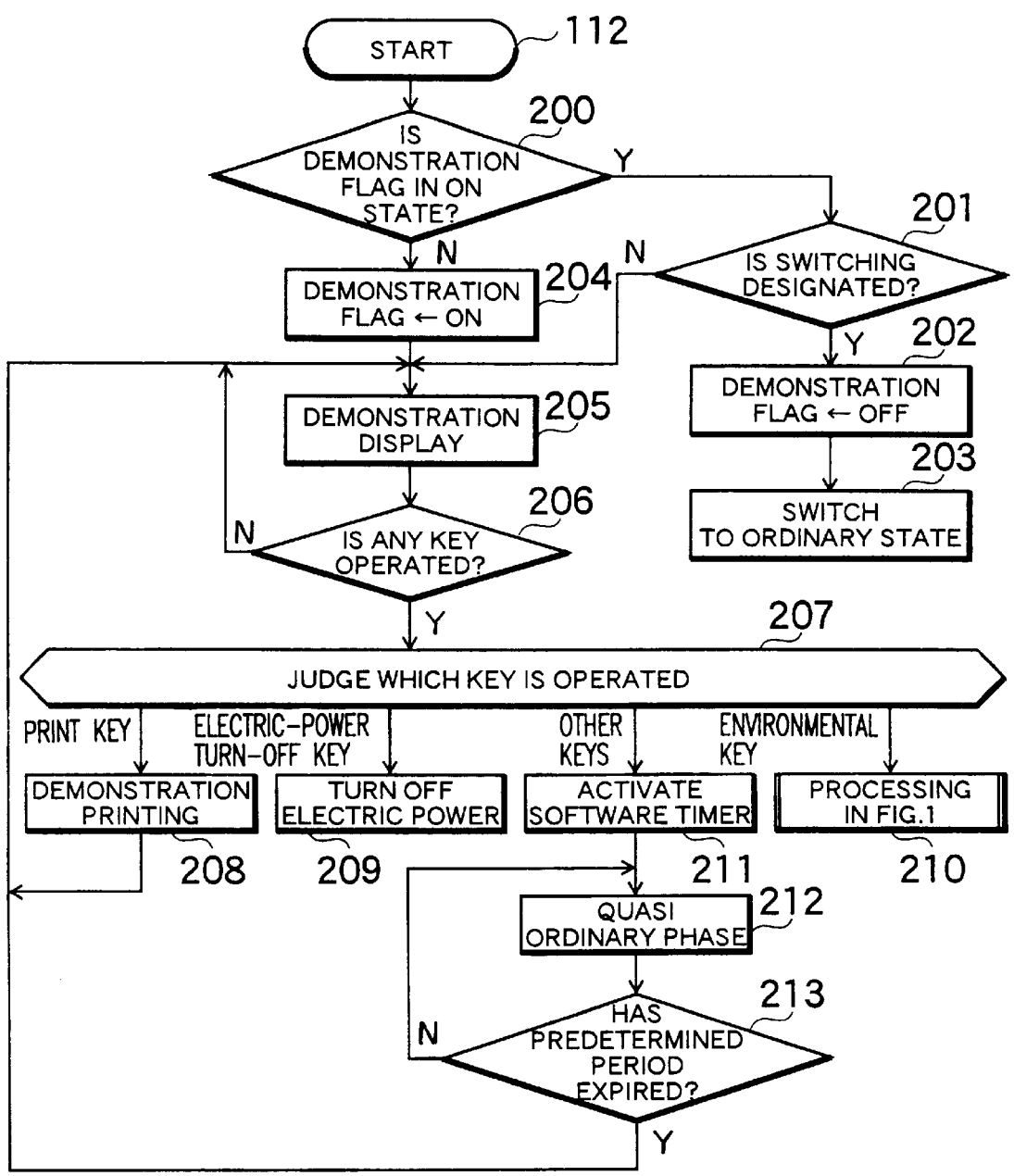

CHARACTER INFORMATION PROCESSOR SWITCHABLE BETWEEN ORDINARY AND DEMONSTRATION STATES

BACKGROUND OF THE INVENTION

1. Field of the Invention

The present invention relates to a character information processor. The present invention can be applied to, for example, a tape printing apparatus which is adapted to print an input character string having one or more lines on a tape.

2. Description of the Related Art

A tape printing apparatus, which is one type of character printing apparatus, is designed to facilitate preparation of a label originated by the user which is to be attached on a spine cover of a file or the like.

A conventional tape printing apparatus has a key which is provided on an operation panel and adapted to input characters so that a desired character string can be previously inputted by operating the key.

Also, the conventional tape printing apparatus has a tape feeding mechanism by which a tape can be fed and discharged through a tape discharging outlet.

Further, the conventional tape printing apparatus has a printing mechanism, including a thermal head, and a tape cutting mechanism provided in this order on the path through which the tape is fed.

In the tape printing apparatus, when a print instruction key is operated, control means controls the tape feeding mechanism to feed the tape at a predetermined speed, and controls the tape printing mechanism to print the previously inputted character string on the tape thus fed.

Also, when printing of the character string is completed, the control means further controls the tape feeding mechanism to vacantly feed the tape (i.e., to feed the tape without performing printing on the tape) until a portion of the tape on which printing is completed is entirely positioned outside the tape printing apparatus, then causes the feeding of the tape to be stopped.

After the feeding of the tape is stopped, the tape portion on which the character string is printed is cut off by the tape cutting mechanism which is driven by the user or driven automatically.

Thus, a label originated by the user having thereon a desired character string can be obtained.

In order to draw the attention of customers or to effectively show the excellent performance of the apparatus to them, the tape printing apparatus is commonly adapted to perform actions to enhance sales appeal, including display processing as a demonstration (hereinafter often referred to as "demonstration display") and print processing as a demonstration (hereinafter often referred to as "demonstration printing").

In order to cause the apparatus to perform such "demonstration display" or "demonstration printing", it can be chosen to produce an apparatus specially designed for performing such "demonstration display" or "demonstration printing". However, this choice is not economical because such apparatuses cannot be sold as merchandise for ordinary use.

In view of the circumstances, there is already proposed an apparatus having functions of performing "demonstration display" and "demonstration printing" (hereinafter each of the functions will be often referred to as "demonstration function").

Conventional tape printing apparatuses having such demonstration functions usually have a configuration in which switching between a demonstration state and an ordinary state can be performed. The demonstration state is a state in which the demonstration display or demonstration printing is performed, while the ordinary state is a state in which ordinary operations of a tape printing apparatus are performed. It should be noted that hereinafter the term "ordinary operation" refers to an operation performed in the ordinary state when it is used with no explanatory note.

In such conventional tape printing apparatuses, when switching between the demonstration state and the ordinary state (hereinafter often referred to as "operation state switching") is performed, no difference in the degree of complexity of operations is made between the switching directions. Specifically, the degree of complexity of operations in the direction where the ordinary state is switched to the demonstration state is the same as that in the direction where the demonstration state is switched to the ordinary state.

In such apparatus, if the switching operations are made simple, unintentional switching caused by an operation mistake is liable to occur. Specifically, the demonstration functions are very useful in attracting the attention of the customers while the apparatus is on display in the shop window. However, after the apparatus is purchased, the demonstration functions are rarely used. Therefore, it is necessary to prevent the ordinary state from being switched to the demonstration state against the user's intention. Nevertheless, when the switching operations are made simple, the ordinary state is liable to be switched to the demonstration state against the user's intention at a high probability.

On the other hand, if the switching operations are made complicated, the complicated switching operations unfavorably lower the usability of the apparatus. Specifically, assuming that the user has mistakenly switched the ordinary state to the demonstration state, if he desires to restore the ordinary state, he must perform the complicated switching operations to switch the demonstration state to the ordinary state.

As described above, so long as there is no difference between the switching directions in the degree of complexity of the switching operations, the above-mentioned problems remain unsolved.

Meanwhile, in the conventional tape apparatuses having demonstration functions, the ordinary operations are conducted only in the ordinary state. That is, ordinary operations cannot be performed in the demonstration state.

Under these circumstances, in the case where a customer sees the demonstration display and feels tempted to try to perform some of the ordinary operations of the apparatus, the demonstration state must be switched to the ordinary state, in which the customer can perform such operations. Further, if it is necessary to restore the demonstration state, the ordinary state must be further switched to the demonstration state.

Thus, in the conventional apparatuses, when the user is tempted to operate the apparatus during the demonstration state, frequent switching operations are needed because the ordinary operations cannot be performed in the demonstration state.

The above-mentioned problems occurring in the conventional tape printing apparatus are also found in the other character information processors having demonstration functions.

SUMMARY OF THE INVENTION

The present invention is accomplished in view of the above-mentioned problems.

It is therefore an object of the present invention to provide a character information processor having demonstration functions in which the above-mentioned problems associated with the operation state switching are eliminated to enhance the usability of the apparatus.

Another object of the present invention is to provide a character information processor having demonstration functions in which part of the ordinary operations can be performed even in the demonstration state.

To achieve the above-mentioned objects, the first aspect of the present invention provides a character information processor which takes, as operation states, an ordinary state, in which ordinary operations are performed, and a demonstration state, in which demonstrating operations including demonstration display and demonstration printing, are performed, said character information processor including: (1) first operation state switching means for switching the ordinary state to the demonstration state when receiving operation signals of a first number during the ordinary state; and (2) second operation state switching means for switching the demonstration state to the ordinary state when receiving operation signals of a second number during the demonstration state, the second number being smaller than the first number.

In the character information processor according to the first aspect of the present invention, first operation state switching means switches the ordinary state to the demonstration state when receiving operation signals of a first number during the ordinary state, and second operation state switching means switches the demonstration state to the ordinary state when receiving operation signals of a second number during the demonstration state, the second number being smaller than the first number.

Further, the second aspect of the present invention provides a character information processor which takes, as operation states, an ordinary state, in which ordinary operations are performed, and a demonstration state, in which demonstrating operations including demonstration display and demonstration printing, are performed, said character information processor including: (1) quasi-ordinary-phase shifting means for shifting the demonstration display to a quasi ordinary phase when receiving an operation signal of a predetermined key during the demonstration display, a part the ordinary operations of the ordinary state being performed in the quasi ordinary phase; and (2) demonstration-display restoring means for restoring the demonstration display when a time consumed in the quasi ordinary phase exceeds a predetermined length.

In the character information processor according to the second aspect of the present invention, quasi-ordinary-phase shifting means shifts the demonstration display to a quasi ordinary phase when receiving an operation signal of a predetermined key during the demonstration display, a part of ordinary operations of the ordinary state being performed in the quasi ordinary phase; and demonstration-display restoring means stores the demonstration display when a time consumed in the quasi ordinary phase exceeds a predetermined length.

BRIEF DESCRIPTION OF THE DRAWINGS

Other features, objects and advantages of the present invention will become apparent from the following description of the preferred embodiments with reference to the drawings in which like reference characters designate like or corresponding parts throughout several views, and in which:

FIG. 4 is a flowchart showing the switching operation between the demonstration state and the ordinary state in the embodiment.

DETAILED DESCRIPTION OF THE INVENTION

Hereinafter, a tape printing apparatus as an embodiment of the character information processor according to the present invention will be described with reference to the attached drawings.

(A) Overall Constitution of Electrical Components

First, the electrical component of a tape printing apparatus as an embodiment of the character information processor according to the present invention will be described with reference to FIG. 2, which is a function block diagram showing the function of each element.

Figure 2:
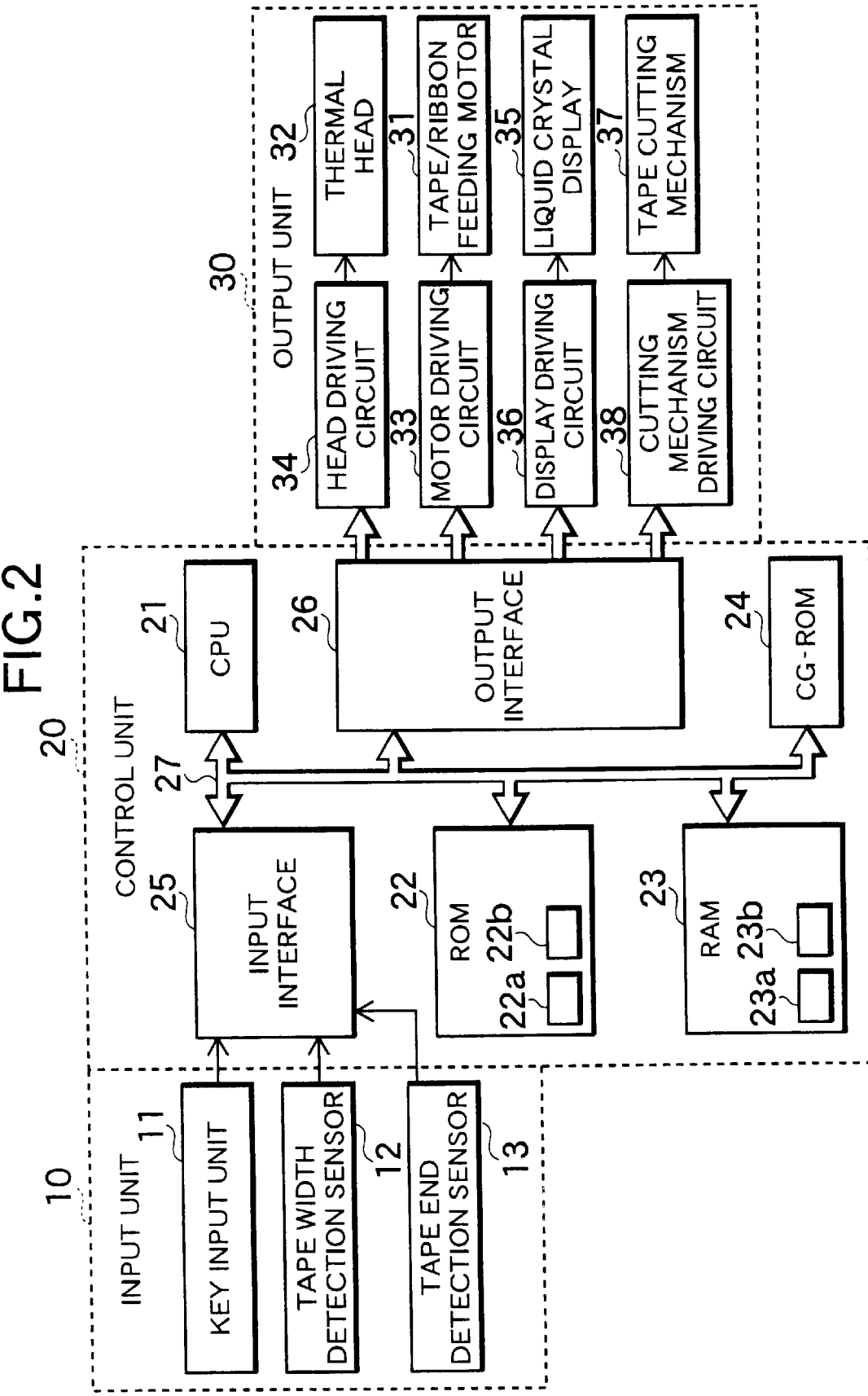
FIG. 2 is a function block diagram showing the overall configuration of the embodiment.

As shown in FIG. 2, similarly to the other character printing apparatuses, the tape printing apparatus of this embodiment includes an input unit 10, a control unit 20, and an output unit 30. The control unit 20 is adapted to execute processing in accordance with information supplied from the input unit 10, a processing stage at that time, and so on, and the result of the processing is outputted from the output unit 30 by way of display or print.

The input unit 10, while not detailed, includes a key input unit 11 having a depression key, a dial key and the like, a tape width detection sensor 12 and a tape end detection sensor 13. The key input unit 11 is adapted to generate character code data and various types of control data to be supplied to the control unit 20. The tape width detection sensor 12 is adapted to detect the width of the loaded tape and to supply tape width information to the control unit 20. In actuality, detecting the tape width by the sensor 12 is conducted by reading a physical identification element (e.g., a hole) provided on a tape cartridge (which accommodates the tape and an ink ribbon) and representing the width of the tape accommodated in the tape cartridge. The tape end detection sensor 13 is adapted to detect ending of the tape (i.e., to detect that the tape is used up) and to supply tape end information to the control unit 20. Ending of the tape is detected, for example, by detecting increased tension of the tape caused by the state that the tape cannot be further pulled out, or alternatively by detecting an identification element provided at the end of the tape.

The output unit 30 includes members serving as a print mechanism and members serving as a display mechanism. The output unit 30 includes a tape/ribbon feeding motor 31 and a thermal head 32, both serving as the print mechanism. The tape/ribbon feeding motor 31 is constituted by, for example, a stepping motor and adapted to feed a tape and a ink ribbon loaded in the tape printing apparatus (both not shown) to a predetermined printing position or to the outside of the tape printing apparatus. The thermal head 32 is, for example, fixed and adapted to perform printing on the running tape by the thermal transferring method. The tape/ribbon feeding motor 31 is driven by a motor driving circuit 33, and the thermal head 32 is driven by the head driving circuit 34, both driven under the control of the control unit 20.

The output unit 30 also includes a tape cutting mechanism 37. The tape cutting mechanism 37 is adapted to cut the tape and is driven by a tape cutting mechanism driving circuit 38 under the control of the control unit 20. Cutting of the tape may be conducted by the force applied by the user.

In the case of the tape printing apparatus according to this embodiment, the output unit 30 includes a liquid crystal display 35 as the display mechanism. The liquid crystal display 35 is driven by a display driving circuit 36 under the control of the control unit 20 and is adapted to directly display an input character string, various attribute information, and so on. On the display 35, there are displayed a plurality of indicators which are adapted to be lighted, flashing or lighted to indicate states of the attributes (such as character sizes and input lines) designated by the characters printed at the portions lying on the apparatus body and surrounding the display 35.

The control unit 20 is constituted by, for example, a microcomputer. The control unit 20 includes a CPU 21, a ROM 22, a RAM 23, a character generator ROM (CG-ROM) 24, an input interface 25 and an output interface 26 that are connected via a system bus 27.

The ROM 22 stores various types of processing programs, and fixed data such as dictionary data for kana-kanji conversion. The RAM 23 is used as a working memory and is adapted to store fixed data associated with the user input. The RAM 23 is backed up even while the electric power is turned off. The ROM 22 and the RAM 23 are exemplified as the memory, as shown in FIG. 2. However, a rewritable nonvolatile memory, such as EEPROM or the like, may serve as the memory. Further, in some cases the RAM 23 may include an add-on RAM as well as the memory provided in the apparatus.

The processing programs and the fixed data stored in the ROM 22, and the fixed data stored in the RAM 23 will be detailed later. The ROM 22 stores a processing program 22a for setting the environmental items and a demonstration-display message 22b which will be described later. In the RAM 23, a print buffer 23a and a display buffer are appropriately formed.

The CG-ROM 24 is adapted to store font information of letters provided in the tape printing apparatus, and to output, when code data for specifying a letter are supplied, font information corresponding thereto. The font information stored in the CG-ROM24 may be either of an outline font and a bitmap font. Alternatively, the CG-ROM 24 may store font information for display purposes and font information for print purposes, the former and latter font information being different from each other.

The input interface 25 is adapted to interface between the input unit 10 and the control unit 20. The output interface 26 is adapted to interface between the output unit 30 and the control unit 20.

The CPU 21 is adapted to execute a processing program stored in the ROM 22 that is determined in accordance with an input signal sent from the input unit 10 and a processing stage at that time while utilizing the RAM 23 as a working area or, if necessary, by appropriately using fixed data stored in the ROM 22 or RAM 23. Also, the CPU 21 is adapted to cause the liquid crystal display 35 to display the state or result of the processing and so on, or to cause the state or result of the processing to be printed on a tape (not shown).

(B) Processing Related to Demonstration State

The tape printing apparatus according to this embodiment is characterized in that processing of switching between a demonstration state and an ordinary state is different from those of conventional apparatuses and in that a part of ordinary operations of the ordinary state can be performed even in the demonstration state.

First, referring to the flowchart in FIG. 1 and the explanatory view in FIG. 3, the processing of switching between a demonstration state and an ordinary state will be described.

Before detailing the processing of switching between the ordinary state and the demonstration state, environmental items will be first described.

The "environmental item" is an item used for setting the environmental conditions, such as physical conditions of the apparatus or the integrated state of the software provided in the apparatus.

In the tape printing apparatus according to the present embodiment, as the environmental item, "print density", "retention value restoration", "retention value setting", "data all copy" and "demonstration switching" are provided.

The "demonstration switching" is an environmental item used for switching between a demonstration state and an ordinary state. When the "demonstration switching" is selected in the demonstration state, the demonstration state is switched to the ordinary state. By contrast, when the "demonstration switching" is selected in the ordinary state, the ordinary state is switched to the demonstration state.

While the environmental items other than the "demonstration switching" are not directly related to the characteristic features of the present embodiment, they have the following features.

The "print density" is an environmental item used for setting the density in printing (i.e., the temperature of the thermal head 32).

The "display density" is an environmental item used for setting the density of display (i.e., transmittance) in the liquid crystal display 35.

The "retention value setting" is an environmental item used for setting basic values of various attributes which are applied to all texts that will be inputted thereafter (e.g., character sizes of the respective lines, dimensions of the margins, selection between vertical and horizontal writings, fonts, and the like).

The "retention value restoration" is an environmental item used for restoring the values of the various attributes, which will be applied to all the texts that will be inputted thereafter, to their default values, which are previously provided in the apparatus.

The "data all copy" is an environmental item used for causing file data to be transferred between the add-on memory and the memory provided in the apparatus.

Next, the flow of the processing of setting environmental items will be described.

When setting of an environmental item is designated by operating a key for setting an environmental item (hereinafter each of such keys will be often referred to as "environmental key") provided in the key input unit 11, the CPU 21 starts the processing program 22a for setting the environmental items shown in FIG. 1. It is preferred that two keys operated simultaneously serve as the environmental key because the environmental items should not be changed unintentionally.

On entering the processing program 22a for setting the environmental items, the CPU 21 first judges the contents of a demonstration flag (step 100), and then performs processing in accordance with the judgement. The demonstration flag is stored, for example, in the RAM 23 that is backed up by electric power, or in a nonvolatile memory (not shown in FIG. 2), such as EEPROM. The contents of the demonstration flag are maintained even while the electric power is turned off.

It should be noted that the contents of the demonstration flag shows the operation state of the apparatus. Specifically, that the demonstration flag is in the on state means that the apparatus will remain in the demonstration state until the environmental key is operated. On the other hand, that the demonstration flag is in the off state means that the apparatus has been in the ordinary state so far.

When it is judged at step 100 that the demonstration flag is in the off state, that is, the apparatus has been in the ordinary state so far, the CPU 21 first causes the liquid crystal display 35 to display the "display density" as an eligible environmental item (step 101). Thus, when the apparatus has been in the ordinary state so far, the "display density" serves as an initial eligible environmental item.

After the "display density" is displayed, the CPU 21 judges which key, the next eligibility key, the previous eligibility key or the selection key, is operated (step 102), and performs processing in accordance with the judgement. It should be noted that, for example, the cursor rightward movement key or the cursor downward movement key serves as the next eligibility key, and that, for example, the cursor leftward movement key or the cursor upward movement key serves as the previous eligibility key.

When it is judged at step 102 that the selection key is operated, the CPU 21 performs concrete processing for setting the display density of the liquid crystal display 35 (step 103).

When it is judged at step 102 that the previous eligibility key is operated, the CPU 21 causes the liquid crystal display 35 to display the "print density" as an eligible environmental item (step 104).

When it is judged at step 102 that the next eligibility key is operated, the CPU 21 causes the liquid crystal display 35 to display the "retention value restoration" as an eligible environmental item (step 107).

On the other hand, when it is judged at step 100 that the demonstration flag is in the on state, that is, the apparatus has been in the demonstration state so far, the CPU 21 causes the liquid crystal display 35 to display the "demonstration switching" as an eligible environmental item (step 110). Thus, when the apparatus has been in the demonstration state so far, the "demonstration switching"serves as an initial eligible environmental item.

After the "demonstration switching" is displayed, the CPU 21 proceeds to the next step 111. At step 111, the CPU 21 judges which key, the previous eligibility key or the selection key, is operated.

When it is judged at step 111 that the selection key is operated, the CPU 21 performs the processing of switching the operation state shown in FIG. 4, which will be described later (step 112).

When it is judged at step 111 that the previous eligibility key is operated, CPU 21 causes the liquid crystal display 35 to display the "data all copy" as an eligible environmental item. It should be noted that the processing of the data all copy is not shown in the flowchart in FIG. 1 (see FIG. 3).

As described above, in this embodiment, the eligible environmental items are changed in the circulating manner by operating the previous eligibility key or the next eligibility key; and when a desired environmental item is displayed, the item is determined by operating the selection key, so that processing in accordance with the environmental item thus determined (steps 106, 103, 109, . . . , 112) is performed.

Further, the displayed initial eligible environmental item differs according to which operation state, the ordinary state or the demonstration state, has been assumed until the environmental key is operated. Accordingly, the number of operations to change the environmental items until the "demonstration switching", which is used for switching the operation state, is obtained.

This means that the processing of switching the ordinary state to the demonstration state is made complicated, while the processing of switching the demonstration state to the ordinary sate is made simple.

Figure 3:
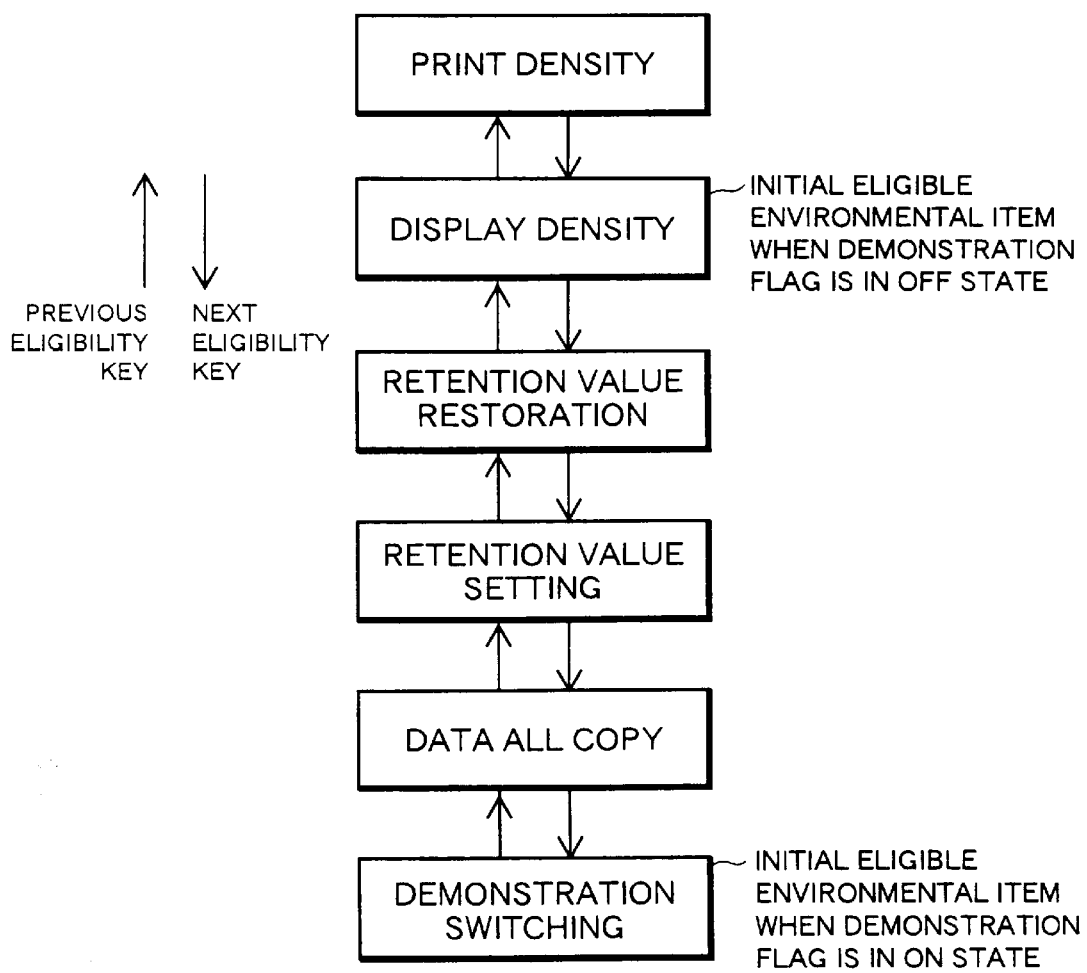
FIG. 3 is an explanatory view showing how to change the eligible environmental items in the embodiment.

Specifically, as shown in FIG. 3, the initial eligible environmental item displayed in the case where the demonstration flag is in the off state (that is, the apparatus has been in the ordinary state so far) is the "display density". Accordingly, in order to reach the "demonstration switching", which is used, in this case, for switching the ordinary state to the demonstration state, the environmental items must be changed at least four times (specifically, the environmental items should be changed as follows: "display density"→"retention value restoration"→"retention value setting"→"data all copy"→"demonstration switching"). Thereafter, the selection key must be operated to determine the item so as to perform the processing of switching. Accordingly, in order to complete the process of switching, five key operations are needed. Thus, the processing of switching the ordinary state to the demonstration state is made complicated.

By contrast, in the case where the demonstration flag is in the on state (that is, the apparatus has been in the demonstration state so far), the initial eligible environmental item is already the "demonstration switching", which is used, in this case, for switching the demonstration state to the "ordinary state". Therefore, there is no need to change the environmental item, so that operating the selection key only one time is enough to complete the processing of switching the demonstration state to the ordinary state. Thus, the process of switching the demonstration state to the ordinary state is made simple.

The configuration in which the switching to the demonstration state is complicated while the switching to the ordinary state is simple is adopted in view of the characteristics of the demonstration state. Specifically, although the demonstration state is necessary while the apparatus is being displayed, it is rarely used after the apparatus is purchased, and therefore switching the ordinary state to the demonstration state is rarely needed.

In view of the foregoing circumstances, by adopting this configuration, switching the ordinary state to the demonstration state is made difficult to perform while switching the demonstration state to the ordinary state is made easy to perform.

Next, referring to the flowchart in FIG. 4, concrete operations of the process of switching the operation state performed at step 112 will be described, while referring to how a part of the ordinary operations are performed in the demonstration state.

As described above, when the "demonstration switching"is displayed and the selection key is operated, the CPU 21 proceeds to step 112. On entering the processing at step 112, the CPU 21 first judges whether the demonstration flag is in the on state or in the off state (step 200). That is, the CPU 21 judges whether the apparatus has been in the demonstration state or in the ordinary state so far.

When it is judged at step 200 that the demonstration flag is in the on state, that is, the apparatus has been in the demonstration state so far, the CPU 21 causes the liquid crystal display 35 to display a message for inquiring of the user whether or not he desires to designate the switching from the demonstration state to the ordinary state, and then judges whether or not he has designated the switching (step 201). Assuming that the designation of the switching is performed by operating the selection key, the CPU 21 judges that, when the selection key is operated, the switching is designated, and that, when a key other than the selection key is operated, the switching is not designated.

When it is judged at step 201 that the switching is not designated, the CPU 21 proceeds to the processing at step 205 which will be described later.

When it is judged at step 201 that the switching is designated, the CPU 21 changes the contents of the demonstration flag from the on state to the off state representing the ordinary state (step 202), and then switches the demonstration state to the ordinary state (step 203).

On entering the ordinary state, the CPU 21 causes the liquid crystal display to display the input screen through which input of a character string is accepted. Thereafter, in the apparatus, ordinary operations can be accepted in accordance with the user's instructions.

On the other hand, when it is judged at step 200 that the demonstration flag is in the off state, that is, the apparatus has been in the ordinary state so far, the CPU 21 changes the contents of the demonstration flag from the off state to the on state representing the demonstration state (step 204), and then proceeds to step 205.

At step 205, the CPU 21 causes the liquid crystal display 35 to perform demonstration display in which the same demonstration-display message 22b is repeatedly displayed in such a way as to be scrolled endlessly (step 205).

While the demonstration-display message 22b is being displayed, the CPU 21 also verifies whether or not any one of the keys provided in the key input unit 11 is operated (step 206).

When it is judged at step 206 that a key is operated, the CPU 21 judges which key is operated (step 207).

When it is judged at step 207 that the operated key is a print key, the CPU 21 causes the liquid crystal display 35 to display a message for informing the user that the apparatus is performing the demonstration printing. At the same time, the CPU 21 causes the print buffer 23a to develop the demonstration-print message, and thereafter drives the thermal head 32 and the tape/ribbon feeding motor 31 to print the demonstration-print message on the loaded tape.

After completing the printing of the demonstration-print message, the CPU 21 drives the tape cutting mechanism 37 to cut off the tape portion on which printing is completed and returns to the demonstration display (step 208). It should be noted that the demonstration-print message may be the same as or different from the demonstration-display message. Alternatively, the demonstration-print message may be changed according to the widths of the loaded tape.

When it is judged at step 207 that the operated key is the electric-power turning-off key, the CPU 21 performs the processing of turning off the electric power (step 209). It should be noted that, as described above, the contents of the demonstration flag are not erased even while the electric power is turned off. Further, when the electric power is turned on, the CPU 21 judges the contents of the demonstration flag, and performs processing based on the judgment. Specifically, when it is judged that the demonstration flag is in the on state representing the demonstration state, the CPU 21 proceeds to step 205. By contrast, when it is judged the demonstration flag is in the off state representing the ordinary state, the CPU 21 causes the liquid crystal display 35 to display an input screen for input of a character string. It should be noted that these processings performed after the electric power is turned on are not shown in the flowchart in FIG. 4.

Figure 1:
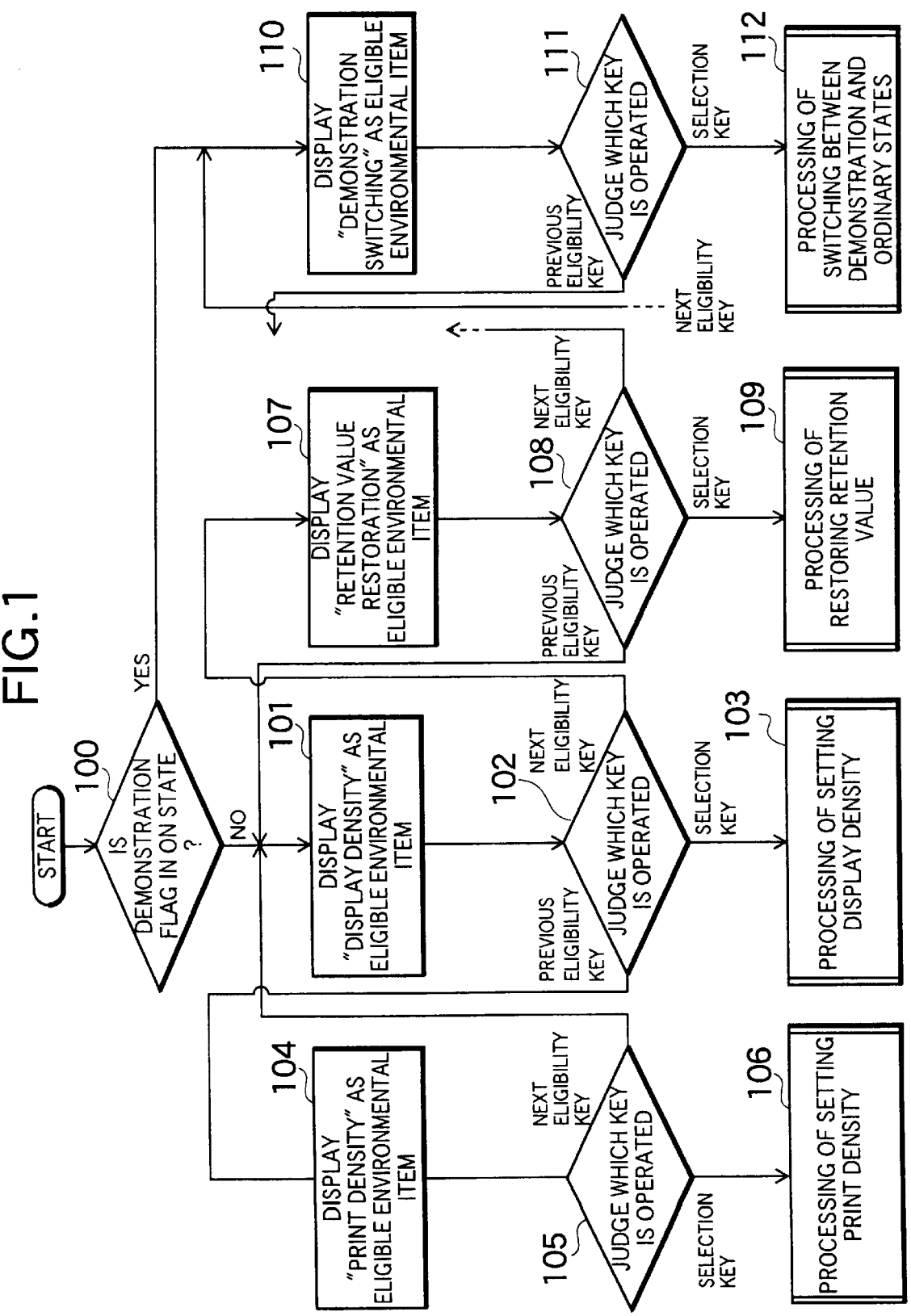
FIG. 1 is a flowchart showing an environment setting processing according to the embodiment.

When it is judged at step 207 that the key operated is an environmental key, the CPU 21 performs the above-described processing shown in FIG. 1 (step 210). This means that the switching from the demonstration state to the ordinary state can be performed also on this occasion.

On the contrary, when it is judged at step 207 that the operated key is a key, other than the print key, electric-power turning-off key and the environmental key, the CPU 21 activates a software timer provided in the apparatus to measure a predetermined period (e.g., one minute) (step 211).

Thereafter, the CPU 21 stops the demonstration display and enters a quasi ordinary phase (step 212). The quasi ordinary phase is a phase included in the demonstration state. In the quasi ordinary phase, a part of the ordinary operations of the ordinary state can be performed.

Specifically, in the quasi ordinary phase, the input screen is displayed on the liquid crystal display 35 so that input of a character string is accepted and a part of ordinary operations which will be detailed later are performed. During the quasi ordinary phase, the CPU 21 monitors whether or not the predetermined period has expired (step 213). When it is judged at step 213 that the predetermined period has expired, the CPU 21 returns to the demonstration display performed at step 205, and at the same time deletes the input character string which has been displayed, thus terminating the quasi ordinary phase.

The quasi ordinary phase is provided for teaching the outline of the operation of the apparatus and allowing the user to perform ordinary operations while maintaining the demonstration state, that is, without switching the demonstration state to the ordinary state.

In the quasi ordinary phase, operations are limited compared with those of the ordinary state because some operations or functions are not suitable for the quasi ordinary phase for the following reasons.

Specifically, while the apparatus is in the quasi ordinary phase, the operators of the apparatus (including those who instruct operation of the apparatus) are not fixed but change frequently. Examples of the operators include those who desire to purchase the apparatus and salesclerks of the shop. Under the circumstances, if an operator perform registration, deletion and the like, the next operator may have trouble in operating the apparatus.

In view of the foregoing circumstances, in the quasi ordinary phase, with respect to the environmental items "retention value restoration", "retention value setting" and "data all copy", no processing is allowed.

Further, with respect to the processings associated with editings related to the functions "external character", "address" and "file", only a part of the processing is allowed to perform. Specifically, with respect to these functions, the processings can be performed until registration and deletion are displayed, but the subsequent processing cannot be performed. Specifically, when registration or deletion is selected out of the displayed choices, the CPU 21 does not perform the processing of registration or deletion but causes the liquid crystal display 35 to display, for a predetermined period, a message informing that processing of registration or deletion cannot be executed in the demonstration state, and restores the input screen.

It should be noted that such inhibition of the execution of the above-mentioned functions is conducted based on the contents of the demonstration flag. Specifically, if one of the above-mentioned functions is designated, the CPU 21 judges the state of the demonstration flag. If it is judged that the state of the demonstration flag is the on state representing the demonstration state, the designated function is not performed.

In the above description, the demonstrating phase, in which the demonstration display is performed, is restored from the quasi ordinary phase when the predetermined period measured by the software timer is expired.

However, the way of restoring the demonstration display from the quasi ordinary phase is not limited thereto. For example, the restoration of the demonstration display may be performed by turning off the electric power and then turning it on again. Specifically, as described above, even while the electric power is turned off, the demonstration flag is not erased. Accordingly, if the electric power is turned off during the quasi ordinary phase, the demonstration flag maintains the on state because the quasi ordinary phase is a phase in the demonstration state. Thereafter, if the electric power is turned on and the demonstration flag is judged to be in the on state, the CPU 21 proceeds to step 205. Thus, the demonstration display is restored.

(C) Advantages of the Embodiment

According to the above-described embodiment, since the switching from the ordinary state to the demonstrations state is made complicated while the switching from the demonstration state to the ordinary state is made simple, the usability of the apparatus is enhanced.

Specifically, the probability that the user mistakenly switches the ordinary state to the demonstrations state can be lowered. Accordingly, the switching from the ordinary state to the demonstration state can be performed only when the user intends to switch the ordinary state to the demonstration state. Further, even when the user mistakenly switches the ordinary state to the demonstration state, the ordinary state can be restored by an easy operation.

Further, according to this embodiment, the quasi ordinary phase, in which the user can try to operate some of the ordinary operations, is provided as a phase of the demonstration state, and ordinary operations can be performed while maintaining the demonstration state. Owing to this configuration, if a customer sees the demonstration display and gets interested in the operations of the apparatus, he can try some of its operations without changing the demonstration state. Thus, the usability of the apparatus is further enhanced.

Further, according to this embodiment, when a predetermined period is expired after entering the quasi ordinary phase, the demonstration display is automatically restored. Owing to this configuration, even though the person who has been operating the apparatus during the quasi ordinary phase so far leaves the apparatus while keeping the apparatus as it is, the demonstration display is automatically restored.

(D) Other Embodiments

Although the preferred embodiments of the present invention have been described above, it should be understood that the present invention is not limited thereto and that other modifications will be apparent to those skilled in the art without departing form the spirit of the invention.

In the above-mentioned embodiment, the designation of switching between the ordinary state and the demonstration state is performed through setting environmental items. However, the way of designating the switching between the ordinary state and the demonstration state is not limited thereto so long as the degree of complexity of operations differs according to the switching directions.

For example, the switching directions may be determined according to the difference in the number of operations of a key which is rarely operated sequentially (for example, a single shift key). Specifically, shifting from the ordinary state to the demonstration state is performed in the following manner. When the shift key is operated five times sequentially during the ordinary state, a message inquiring of the user whether or not he desires to switch the ordinary state to the demonstration state is displayed. Thereafter, when the user operates the execution key, the ordinary state is switched to the demonstration state. By contrast, switching from the demonstration state to the ordinary state is performed in the following manner. When the shift key is operated two times sequentially during the demonstration state, a message inquiring of the user whether or not he desires to switch the demonstration state to the ordinary state is displayed. Thereafter, when the user operates the execution key, the demonstration state is switched to the ordinary state.

Further, in the above-mentioned embodiment, when the electric power is turned on, the apparatus rises either in the demonstration state or in the ordinary state depending on the contents of the demonstration flag at the time when the electric power is turned on. However, the apparatus may be configured in such a manner as to rise in the ordinary state regardless of the contents of the demonstration flag.

Further, in the above-mentioned embodiment, measuring the predetermined period needed for restoring the demonstration display is started from the point of time when the quasi ordinary phase is initiated. However, measuring the predetermined period may be started from the point of time when the key operation is stopped.

Further, in the above embodiment, the character information processor according to the present invention is applied to the tape printing apparatus, but the present invention is not limited thereto. The present invention can be applied to character information processors other than the tape printing apparatus, such as a stamp producing apparatus.

(E) Advantages of the Invention

As described above in detail, according to the character information processor of the first aspect of the present invention, there are provided first operation state switching means for switching the ordinary state to the demonstration state when receiving operation signals of a first number during the ordinary state, and second operation state switching means for switching the demonstration state to the ordinary state when receiving operation signals of a second number during the demonstration state, the second number being smaller than the first number. Owing to this configuration, the probability that the operation state is mistakenly switched to the demonstration state is lowered. Also, even when the operation state is mistakenly changed to the demonstration state, the ordinary state can be easily restored. Thus, the usability of a character information processor is enhanced.

Further, according to the character information processor of the second aspect of the present invention, there are provided quasi-ordinary-phase shifting means for shifting the demonstration display to a quasi ordinary phase when receiving an operation signal of a predetermined key during the demonstration display, a part of ordinary operations of the ordinary state being performed in the quasi ordinary phase; and demonstration-display restoring means for restoring the demonstration display when a time consumed in the quasi ordinary phase exceeds a predetermined length. Owing to this configuration, some of the ordinary operations can be performed in the demonstration state. Also, the demonstration display is automatically restored when a predetermined period is expired after entering the quasi ordinary phase. Thus, the usability of the character information processor is further enhanced.

It should be noted that, since the present invention is not limited to the above-described embodiments and modifications, the present invention is to be determined solely by the appended claims.

What is claimed is:

1. A character information processor which is switchable between plural operation states including an ordinary state, in which ordinary operations are performed, and a demonstration state, in which demonstrating operations including demonstration display and demonstration printing, are performed, said character information processor comprising:

first operation state switching means for switching the ordinary state to the demonstration state responsive to receipt of operation signals of a first number during the ordinary state; and second operation state switching means for switching the demonstration state to the ordinary state responsive to receipt of operation signals of a second number during the demonstration state, the second number being smaller than the first number.

2. A character information processor which is switchable between plural operational states including an ordinary state, in which ordinary operations are performed, and a demonstration state, in which demonstrating operations including demonstration display and demonstration printing, are performed, said character information processor comprising:

quasi-ordinary-phase shifting means for shifting the demonstration display to a quasi ordinary phase responsive to receipt of an operation signal of a predetermined key during operation of the demonstration display, said quasi-ordinary-phase being a phase included in the demonstration state which additionally allows a portion, but less than all, of the ordinary operations of the ordinary state to be performed; and demonstration-display restoring means for restoring the demonstration display responsive to lapse of a predetermined time in the quasi ordinary phase.

3. The character information processor according to claim 2, wherein plural keys, other than a key for instructing switching from the demonstration state to the ordinary state, an electric-power turning-off key, and a key for activating the demonstration printing, serve as said predetermined key.

4. A character information processor according to claim 1, further comprising a single key for generating said first number of operation signals by operation a first number of times and for generating said second number of operation signals by operation a second number of times.

5. The character information processor according to claim 1, further comprising a power switch for generating at least an on signal, said character information processor assuming an ordinary state responsive to receipt of said on signal.

6. The character information processor according to claim 2, further comprising a single key for generating said first number of operation signals by operation a first number of times and for generating said second number of operation signals by operation a second number of times.

7. The character information processor according to claim 6, wherein said predetermined time starts when operation of the key is stopped.

8. The character information processor according to claim 2, further comprising a power switch for generating at least an on signal, said character information processor assuming an ordinary state responsive to receipt of said on signal.

* * * * *

UNITED STATES PATENT AND TRADEMARK OFFICE
CERTIFICATE OF CORRECTION

PATENT NO. : 5,961,232
DATED : October 5, 1999
INVENTOR(S) : Watanabe *et al.*

It is certified that error appears in the above-indentified patent and that said Letters Patent is hereby corrected as shown below:

Col. 4, line 58, after "and" insert --is--.

Col. 5, line 14, delete "lighted" (first instance) and insert therefore --darkened--.

Col. 11, line 61, "directions" should read --direction--.

Signed and Sealed this

Seventeenth Day of April, 2001

Attest:

NICHOLAS P. GODICI

*Attesting Officer*     *Acting Director of the United States Patent and Trademark Office*